(12) United States Patent
Falgout, Sr. et al.

(10) Patent No.: US 6,997,811 B1
(45) Date of Patent: Feb. 14, 2006

(54) SEALED FLEXIBLE MOTOR COUPLING

(76) Inventors: Thomas E. Falgout, Sr., 110 Charles Read St., Lafayette, LA (US) 70503; Chad M. Daigle, 501 Hidden Acres Dr., Lafayette, LA (US) 70503

( * ) Notice: Subject to any disclaimer, the term of this patent is extended or adjusted under 35 U.S.C. 154(b) by 0 days.

(21) Appl. No.: 10/811,037

(22) Filed: Mar. 26, 2004

(51) Int. Cl.
*F16D 3/84* (2006.01)

(52) U.S. Cl. .................. 464/19; 464/173; 175/101; 175/325.5; 27/634; 27/637

(58) Field of Classification Search ............. 464/16, 464/19, 20, 173, 175; 175/101, 325.5; 277/625, 277/634–637
See application file for complete search history.

(56) References Cited

U.S. PATENT DOCUMENTS

| | | | | |
|---|---|---|---|---|
| 2,638,988 A | * | 5/1953 | Williams | ............ 175/325.2 X |
| 3,126,722 A | * | 3/1964 | Kramer et al. | ................ 464/16 |
| 3,283,823 A | * | 11/1966 | Warrington | .......... 175/325.2 X |
| 3,707,852 A | * | 1/1973 | Burckhardt et al. | ........ 464/173 |
| 4,263,788 A | * | 4/1981 | Beimgraben | .............. 464/19 X |
| 4,976,655 A | * | 12/1990 | Hebert, Sr. | ................. 464/16 |
| 5,176,576 A | * | 1/1993 | Moulindt | ............... 277/637 X |
| 6,569,020 B1 | | 5/2003 | Falgout | |

\* cited by examiner

*Primary Examiner*—Greg Binda
(74) *Attorney, Agent, or Firm*—John D. Jeter

(57) ABSTRACT

A hermetic seal functions as a closure between opposite ends of the coupling by combining a metal sleeve and an elastomer sleeve extension. The metal sleeve is sealingly attached to the outer surface of one end of the coupling and the elastomer sleeve, sealingly attached to the metal sleeve, is attached at the distal end to the other end of the coupling. As an alternative, the distal end may be bonded to a second metal sleeve sealingly attached to the other end of the coupling. The seal may be convoluted, with multiple convolutions.

8 Claims, 3 Drawing Sheets

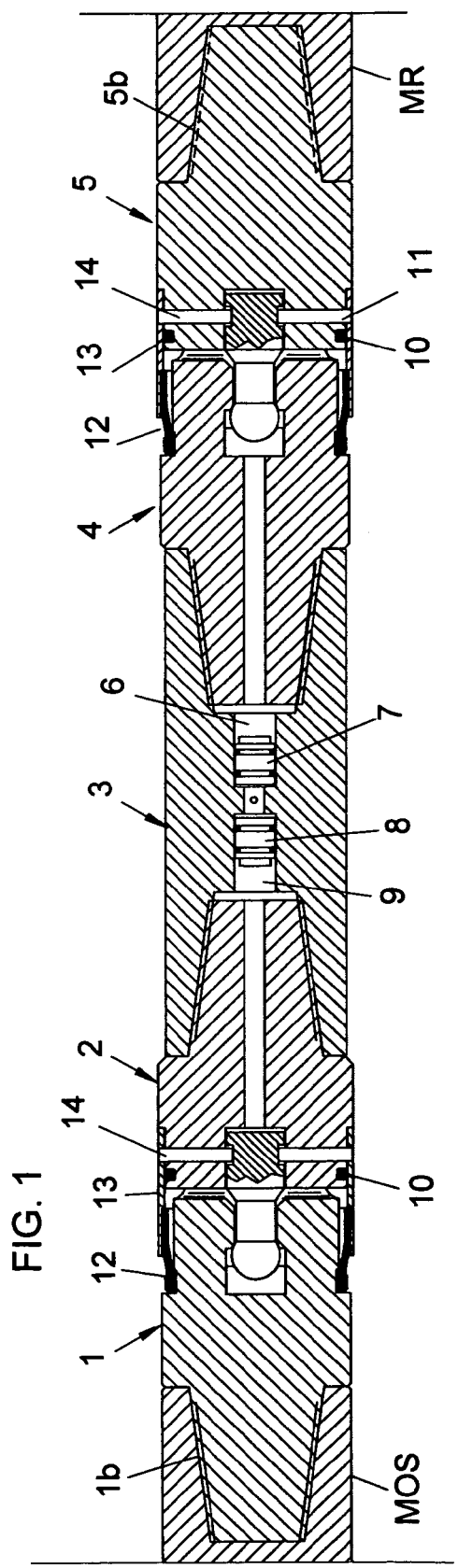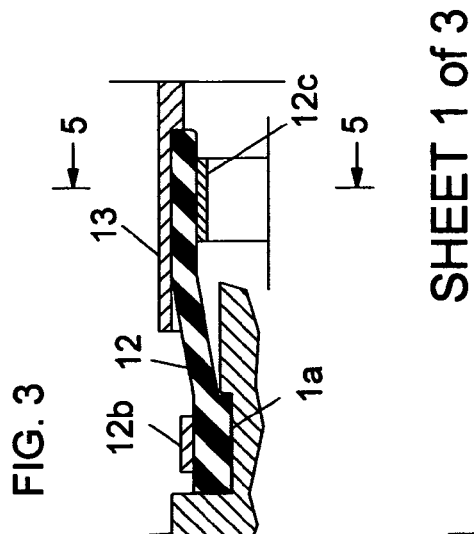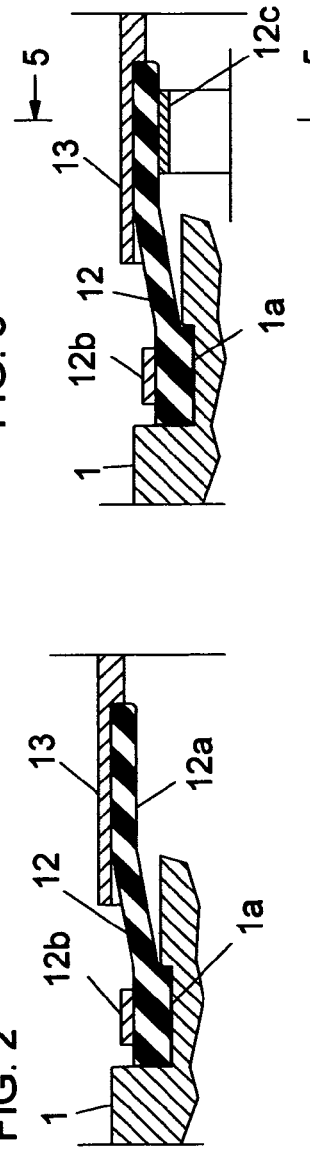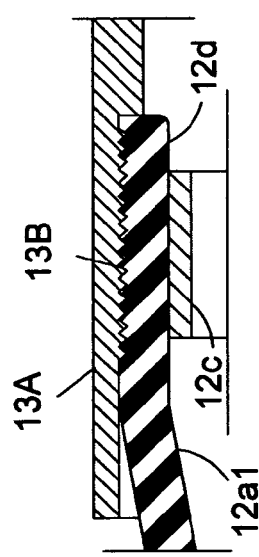

SEALED FLEXIBLE MOTOR COUPLING

This invention pertains to a hermetic seal for flexible shaft couplings. More particularly, but not in a limiting sense, it serves to seal jaw-type couplings in down hole drilling motors.

BACKGROUND

In the drilling industry, some down hole mud powered drilling motors require flexible shafts to connect the power producing rotors to stable output shafts. Limited radial space limits the shafts to sizes that are challenged by the output torque of the motor rotors. The flexible couplings have been a source of life limiting factors for such motors since their introduction in the drilling activity.

The couplings having rubbing surfaces are available in a sealed version and in an unsealed version. If unsealed, limited life has attended the usual high reliability. If sealed, the couplings have little wear and high reliability, while the seals last. They suffer serious wear and consequent damage when the seals fail. The seals have reliability problems and sealed coupling has a consequent lack of reliability.

Seal designs have been subject to many design efforts, yet the problem remains throughout the related drilling activities. Drilling activities are rather costly and reliability problems in the down hole assemblies produce unplanned costs that are reflected in the cost of petroleum produces.

The seal design disclosed herein is associated with existing coupling designs that function quite well as long as the seals last. The disclosure includes a satisfactory coupling of the jaw-clutch configuration, and it is being produced with that jaw-type coupling. The seal will be used with other types of couplings when testing operations are complete. The disclosure with the jaw-type coupling is not to be construed in a limiting sense. That is anticipated by and is reflected in the claims. In addition to coupling motor rotors to output shafts, flexible couplings are used between bearing supported output shaft members to allow the motor output shaft to function in bend motor bodies used in directional drilling activities. The disclosed seals will be used in such bent motors to seal the lower couplings when proven in the rotor and output shaft couplings.

SUMMARY OF THE INVENTION

Axially opposite sides of the coupling are hermetically connected by a metal sleeve extending from one side toward the other side. An elastomer sleeve is hermetically attached to the sleeve and extends to the other side to which it is hermetically attached. Between the two attachments the sleeve flexes as the coupling flexes. Preferably, one end of the elastomer sleeve is bonded to the metal sleeve and the other end is clamped to the other end of the coupling. An alternate for of the seal provides an expansion sleeve swelled inside the elastomer sleeve radially inward of the bonded surface of the elastomer sleeve.

An alternate configuration provides outer metal sleeves extending from each coupling end toward the other coupling end, the two metal sleeves being joined by a convoluted bellows, preferably an elastomer bellows but possibly a metal bellows.

These and other objects, advantages, and features of this invention will be apparent to those skilled in the art from a consideration of this specification, including the attached claims and appended drawings.

BRIEF DESCRIPTION OF DRAWINGS

FIG. 1 is a side elevation, in cutaway, of the complete rotor to output shaft version.

FIG. 2 is fragmented view of a section through the seal and connecting structure.

FIG. 3 is a fragmented view, similar to FIG. 2 but with an alternate security band.

FIG. 4 is similar to FIG. 3 with surface grooves in the area of sleeve connection.

DETAILED DESCRIPTION OF DRAWINGS

Figure 6:
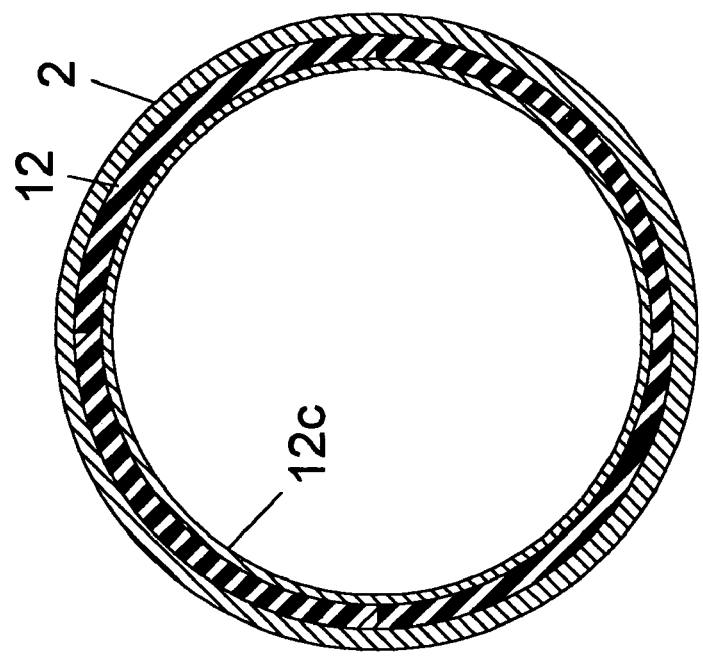
FIG. 6 is similar to FIG. 5, with the security band expanded in place.

In the formal drawings, features that are well established in the art and do not bear upon points of novelty are omitted in the interest of descriptive clarity. Such omitted features may include threaded junctures, weld lines, sealing elements, pins and brazed junctures.

FIG. 1 shows parts 1 and 2 which comprise a first jaw-type coupling. Parts 4 and 5 comprise a similar second coupling. Part 3 comprises an arbor connecting the two couplings. As shown, the assembly connects a motor armature and a motor output shaft by way of tool joint pins 1b and 5b. Both parts 2 and 5 have identical metal sleeves 13 sealingly secured by pins 14. Elastomer sleeves 12, shown in more detail later herein are each bonded to metal sleeves 13 and extend, and are hermetically clamped, to coupling parts either 1 or 4.

The assembly shown is presented with identical couplings and seals. The size of motors served by the seals usually have configurations related the size. The couplings of FIG. 1 normally flex less than three degrees and the elastomer sleeves flex proportionally. Thin elastomer sleeves tend to fail by creasing and are usually installed with initial axial tension. Thicker sleeves are less inclined to crease but do challenge the attachments at the ends. Thick sleeves are best installed with initial axial compression. To serve a range of motor sizes the coupling arrangement shown may be provided in maximum diameters from about one inch to about six inches. Mid-range coupling sizes may have elastomer sleeve thicknesses that can be installed without axial stress. Those factors are anticipated by and are within the scope of the claims.

Arbor 3 is used to house lubricant reservoirs. Piston 8 is sealingly slidable in bore 9 to provide a variable volume reservoir to lubricate the left coupling. A similar piston 7 is sealingly slidable in bore 6 to provide a second variable volume reservoir to provide lubricant for the right end coupling. Arbor 3 is shown connected to the two couplings by tool joint threads but may, in selected sizes, be part of either or both couplings. Metal sleeve 13 is identical on both couplers and is secured to the right end portion of each coupling by cross-pins 14. Seals 10 are shown as "O" rings but may be of any practical form. Pins 14, in the configuration shown, are part of the assembly of the jaw coupling and function also to hold the coupling together but the specific jaw clutch configuration is not part of the present invention.

The motor output shaft, end shown as MOS, the novel coupling assembly, and the motor rotor, end shown as MR, represent the principal power producing and power conducting assembly of the usual down hole drilling motor.

Some rigid parts in flexible couplings require some separation which creates a cavity that must be filled with non-compressible fluids when used in a well. This volume provides a convenient lubricant space if a closure for the lubricant space is provided to separate the lubricant from the drilling fluids. To avoid rubbing surfaces related to sealing materials, the seals can be made flexible if they are securely fastened to parts served by the lubricant but subject to relative motion.

Parts 1 and 2 are rigid and have un-occupied space therebetween to allow flexibility of the coupling. That space is a containment for lubricant. Sleeve 12 provides a closure to confine the lubricant and to exclude drilling mud. The same applies to the space between parts 4 and 5.

FIG. 2 shows the seal 12 sectioned, and rather enlarged, and fragments of the structures to which it is attached. The attachment fragments are for the left hand coupling. The seal for the right hand coupling is identical. The right end 12a of elastomer sleeve 12 is shown bonded to the left end of metal sleeve 13. The left end of the elastomer sleeve is captured and retained in groove 1a of coupling end 1. Securing band 12b may be of wrapped construction or it may be a metal band. It is clamped on after the sleeve 12 is in its final position as assembled.

FIG. 3 has all of the elements of FIG. 2 but has an added internal securing band 12c. The band 12c can be deformed for installation in the position shown, and expanded into final position. The related details are shown by FIGS. 5 and 6.

FIG. 4 is similar to FIG. 3 with grooves 13B on the inner surface of the metal sleeve 13A in the area contacted by the elastomer sleeve 12a1. Inner band 12c exerts radially outward force on the surface 12d of sleeve 12a1 to seal and secure the assembly with or without bonding in the area of grooves 13B.

Figure 5:
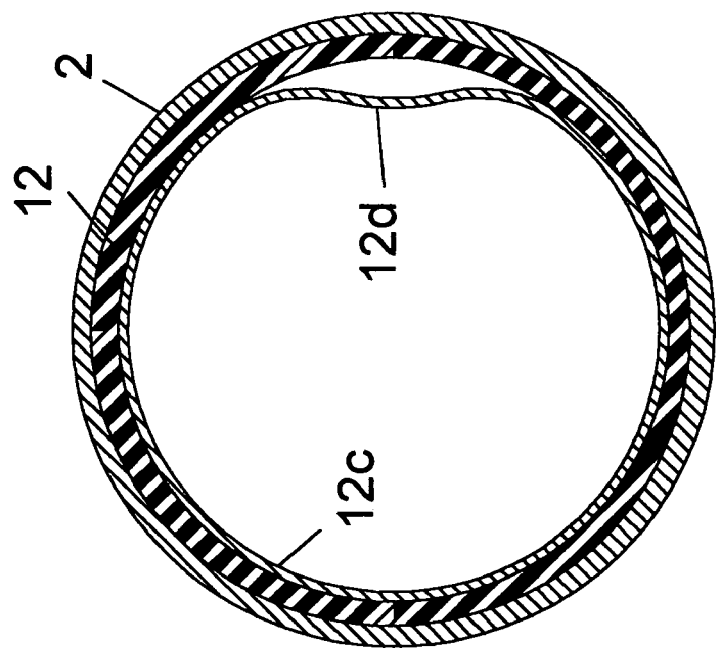
FIG. 5 is a sectional view taken along line 5—5, showing only the seal related parts in the insertion configuration.

FIG. 5 is an enlarged sectional view, taken along line 5—5, showing inner band 12c with a shrinking bulge 12d which allows the band to be placed in the bore of sleeve 12.

FIG. 6 shows band 12c forced into circular shape to expand it radially against the inner surface of sleeve 12.

Figure 7:
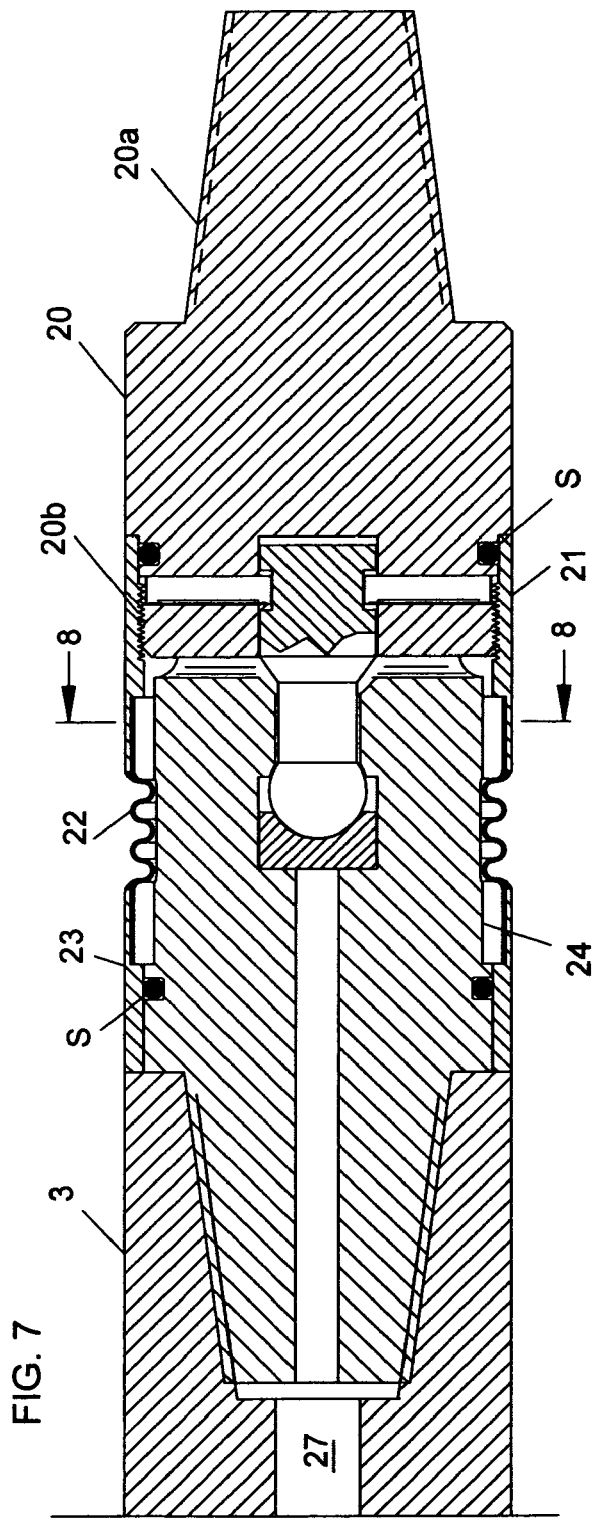
FIG. 7 is a side elevation of an alternate form of a single coupling with a convoluted seal.

FIG. 7 is an alternate coupling seal configuration. This Figure can be compared with the right coupling of FIG. 1.

The jaw features of the coupling, if jaw couplings are used, can be identical with the seal related areas but changed to accept the bellows seal shown.

Part 3 is the same as part 3 of FIG. 1. The principal coupling drive portion is embodied in parts 20 and 24. Metal sleeve 21 is secured to part 20 by threads 20b. Bellows 22 is bonded to sleeves 21 and 23. Sleeve is trapped on part 24 by attaching part 3 to part 24. Both metal sleeves are sealed to the mating parts by O-rings (or equivalent seals) S.

Tool joint pin 20a is one means to attach the coupling to the related motor shaft.

Figure 8:
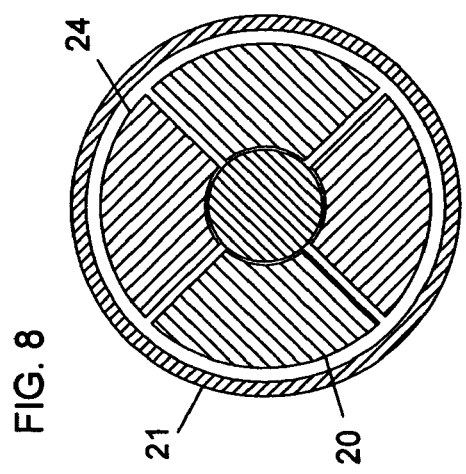
FIG. 8 is a sectional view taken along line 8—8.

FIG. 8 is a cross section taken along line 8—8. The configuration of the torque transfer configurations of parts 20 and 24 are not points of novelty herein but are shown to clarify the situation of metal sleeve 21.

Figure 9:
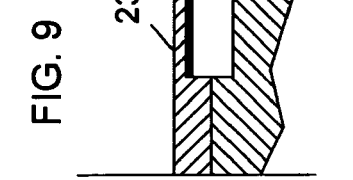
FIG. 9 is a fragmental view, rather enlarged of the convoluted seal sown in FIG. 7.

FIG. 9 is a fragmented view, rather enlarged, of the area of seal bellows seal 22 and metal sleeves 21 and 23. Optional wire rings 25 are situated inside the convolutions to prevent inward wrinkling of the convolutions. Optional wire rings 26 are situated on the outside of the convolutions to prevent outward wrinkling of the convolutions.

Figure 10:
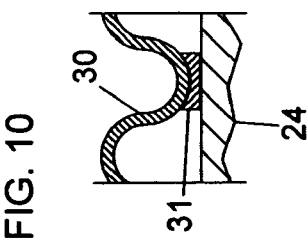
FIG. 10 is a fragmented view, more enlarged of a short portion of a bellows seal as viewed in FIG. 9.

FIG. 10 shows a metal bellows that may be used in lieu of elastomer. Metal bellows 30, if used, may be provided with an inner wear ring 31 on at least one convolution to prevent radial deformation usually caused by dynamics of movement or fluid surging of the confined lubricant.

From the foregoing, it will be seen that this invention is one well adapted to attain all of the ends and objects hereinabove set forth, together with other advantages which are obvious and which are inherent to the flexible coupling.

It will be understood that certain features and sub-combinations are of utility and may be employed without reference to other features and sub-combinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

What is claimed is:

1. A coupling assembly for connecting, as an axially serial continuation, a down hole motor rotor to an output shaft of the down hole motor, the coupling assembly comprising:
   a) a first flexible coupling, having a first lubricant space therein, arranged for connection, at a first end, to the output shaft and connected at a second end to a second flexible coupling;
   b) said second flexible coupling, having a second lubricant space therein, arranged for connection at a third end to the first coupling end, at a fourth end for connection to the motor rotor;
   c) a first flexible seal situated in the first flexible coupling, arranged to function as a closure for said first lubricant space, the seal comprising a first metal sleeve sealingly and peripherally attached to one end of the first coupling, a first elastomer sleeve sealingly and peripherally attached at one end to the inside surface of the distal end of the first metal sleeve and sealingly and peripherally attached at the other end to the other end of the first flexible coupling;
   d) a second flexible seal situated in the second flexible coupling, arranged to function as a closure for said second lubricant space, the seal comprising a second metal sleeve sealingly and peripherally attached to one end of the second coupling, a second elastomer sleeve peripherally attached at one end to the inside surface of the distal end of the second metal sleeve and sealingly and peripherally attached at the other end to the other end of the second flexible coupling; and
   e) at least one variable volume lubricant reservoir in the assembly and arranged with fluid channels to provide lubricant to at least one of said first and said second lubricant spaces.

2. The coupling assembly of claim 1 wherein the variable volume reservoir comprises two variable volume reservoirs, each variable volume reservoir arranged to supply lubricant to a different one of the two couplings.

3. The coupling assembly of claim 1 wherein each elastomer sleeve is bonded to its related metal sleeve.

4. The coupling assembly of claim 1 wherein each elastomer sleeve is attached to the other end of the related flexible coupling by a retaining peripheral band.

5. The coupling assembly of claim 1 wherein the flexible sleeve is attached to the metal sleeve by radial force exerted by an internal peripherally expanded band.

6. The coupling assembly of claim 1 wherein each elastomer sleeve is related to mounting provisions such that, when the related coupling is straight, each elastomer sleeve is in initial axial tension.

7. The coupling assembly of claim 1 wherein each elastomer sleeve is related to mounting provisions such that, when the related coupling is straight, each elastomer sleeve is in initial axial compression.

8. The coupling assembly of claim 1 wherein the elastomer sleeve is provided with a security ring expanded inside the elastomer sleeve to urge it against the related metal sleeve.

* * * * *